(12) United States Patent
Pribosek

(10) Patent No.: US 12,345,638 B2
(45) Date of Patent: Jul. 1, 2025

(54) OPTICAL PARTICLE COUNTER FOR AIR QUALITY ASSESSMENT

(71) Applicant: ams AG, Premstaetten (AT)

(72) Inventor: Jaka Pribosek, Eindhoven (NL)

(73) Assignee: AMS AG, Premstaetten (AT)

( * ) Notice: Subject to any disclaimer, the term of this patent is extended or adjusted under 35 U.S.C. 154(b) by 232 days.

(21) Appl. No.: 17/778,153

(22) PCT Filed: Oct. 28, 2020

(86) PCT No.: PCT/EP2020/080291
§ 371 (c)(1),
(2) Date: May 19, 2022

(87) PCT Pub. No.: WO2021/099081
PCT Pub. Date: May 27, 2021

(65) Prior Publication Data
US 2022/0412866 A1  Dec. 29, 2022

Related U.S. Application Data

(60) Provisional application No. 62/939,036, filed on Nov. 22, 2019.

(51) Int. Cl.
*G01N 21/53* (2006.01)
*G01N 15/0205* (2024.01)
(Continued)

(52) U.S. Cl.
CPC ......... *G01N 21/53* (2013.01); *G01N 15/0211* (2013.01); *G01N 15/1434* (2013.01);
(Continued)

(58) Field of Classification Search
CPC ............... G01N 15/02; G01N 15/0205; G01N 15/0211; G01N 15/075; G01N 15/10;
(Continued)

(56) References Cited

U.S. PATENT DOCUMENTS 3,528,743 A * 9/1970 Kaufman ............. G01N 21/538
356/342
3,563,661 A * 2/1971 Ahlquist ............... G01N 21/532
702/22
(Continued)

FOREIGN PATENT DOCUMENTS

CN 203587475 U 5/2014
CN 106461530 A * 2/2017 ......... G01N 15/1404
(Continued)

OTHER PUBLICATIONS

Pribosek Jaka et al: "Estimation of the Particle Sizing Error Due to Particle Position in an Integrated PM2.5 Optical Particle Counter", Proceedings of Eurosensors 2018, vol. 2, No. 13, Dec. 4, 2018, p. 850, XP055774784, DOI: 10.3390/proceedings2130850. Retrieved from the Internet: URL: https://www.mdpi.com/2504-3900/2/13/850# [retrieved on Feb. 11, 2021] the whole document.
(Continued)

*Primary Examiner* — Gordon J Stock, Jr.
(74) *Attorney, Agent, or Firm* — Tarolli, Sundheim, Covell & Tummino LLP

(57) ABSTRACT

An apparatus for sensing particulate matter in a fluid includes a fluid flow conduit fluidically connected to an interaction chamber; a light source positioned to illuminate the interaction chamber; and a light detector assembly positioned to receive light scattered by particulate matter present in the interaction chamber. The light detector assembly includes a light detector; and an optical element, the optical element configured to provide light to the light detector based on an incidence angle of the scattered light.

6 Claims, 13 Drawing Sheets

(51) Int. Cl.
  *G01N 15/14* (2024.01)
  *G01N 15/1434* (2024.01)
  *G01N 21/47* (2006.01)

(52) U.S. Cl.
  CPC . *G01N 15/1459* (2013.01); *G01N 2015/0238* (2013.01); *G01N 2015/1486* (2013.01); *G01N 2021/4704* (2013.01); *G01N 2021/4711* (2013.01); *G01N 2021/4726* (2013.01)

(58) Field of Classification Search
  CPC .............. G01N 15/1012; G01N 15/14; G01N 15/1425; G01N 15/1434; G01N 15/1436; G01N 15/149; G01N 2015/0023; G01N 2015/0026; G01N 2015/00248; G01N 2015/0042; G01N 2015/0046; G01N 2015/0053; G01N 2015/0216; G01N 2015/0222; G01N 2015/0238; G01N 2015/025; G01N 2015/0277; G01N 2015/0288; G01N 2015/0294; G01N 2015/03; G01N 2015/035; G01N 2015/1006; G01N 2015/1028; G01N 2015/1029; G01N 2015/103; G01N 2015/1447; G01N 2015/145; G01N 2015/1452; G01N 2015/1477; G01N 2015/1486; G01N 2015/1493; G01N 2015/1495; G01N 2015/1497; G01N 21/47; G01N 21/4788; G01N 21/49; G01N 21/53; G01N 21/532; G01N 21/534; G01N 21/538; G01N 2021/4702; G01N 2021/4704; G01N 2021/4707; G01N 2021/4709; G01N 2021/4711; G01N 2021/4714; G01N 2021/4716; G01N 2021/4719; G01N 2021/4721; G01N 2021/4723; G01N 2021/4726; G01N 2021/4728; G01N 2015/4721; G01N 2015/4723; G01N 2015/4726; G01N 2015/4728
  See application file for complete search history.

(56) References Cited

U.S. PATENT DOCUMENTS

| | | | | |
|---|---|---|---|---|
| 3,830,569 A * | 8/1974 | Meric | ................ | G01N 15/0211 356/336 |
| 3,835,315 A * | 9/1974 | Gravitt, Jr. | ......... | G01N 15/0205 250/222.2 |
| 4,188,121 A * | 2/1980 | Hirleman, Jr. | ...... | G01N 15/0205 356/336 |
| 4,341,471 A * | 7/1982 | Hogg | ................ | G01N 15/1436 356/343 |
| 4,702,598 A * | 10/1987 | Bohmer | ............. | G01N 15/1436 356/417 |
| 4,975,237 A * | 12/1990 | Watling | ................ | G01J 3/4412 356/338 |
| 5,037,207 A * | 8/1991 | Tomei | ...................... | G02B 6/08 356/417 |
| 5,461,476 A * | 10/1995 | Fournier | ............... | G01N 21/474 385/115 |
| 5,764,358 A * | 6/1998 | Heffels | .............. | G01N 15/0211 356/336 |
| 6,084,670 A * | 7/2000 | Yamazaki | .............. | G01N 15/14 359/741 |
| 6,869,569 B2 * | 3/2005 | Kramer | .............. | G01N 15/1031 436/63 |
| 7,369,231 B2 * | 5/2008 | Nagai | .................. | G01N 21/532 356/338 |
| 7,496,463 B2 * | 2/2009 | Nicoli | ................ | G01N 15/0205 702/104 |
| 7,843,563 B2 * | 11/2010 | Fritz | .................... | G02B 5/1819 356/336 |
| 7,876,436 B2 * | 1/2011 | Chu | .................... | G01N 15/1434 356/336 |
| 7,983,445 B2 * | 7/2011 | Knox | ..................... | G01N 21/85 382/103 |
| 8,692,993 B2 * | 4/2014 | Mendele | ............ | G01N 15/1404 436/63 |
| 8,705,036 B2 * | 4/2014 | Peters | ................ | G01N 15/0205 356/337 |
| 10,048,187 B2 * | 8/2018 | Spriggs | ............. | G01N 15/0205 |
| 10,101,260 B2 * | 10/2018 | Reed | .................. | G01N 15/1434 |
| 10,473,519 B2 * | 11/2019 | Morrell | .................. | G01N 21/85 |
| 2003/0096302 A1 * | 5/2003 | Yguerabide | ........... | G01N 21/47 435/7.1 |
| 2004/0011975 A1 | 1/2004 | Nicoli et al. | | |
| 2013/0169953 A1 * | 7/2013 | Zordan | .................. | G01N 21/53 359/885 |
| 2014/0053586 A1 * | 2/2014 | Poecher | ................... | F24F 11/49 73/28.01 |
| 2022/0326139 A1 * | 10/2022 | Kajihara | .............. | G02B 5/26 |

FOREIGN PATENT DOCUMENTS

| | | | | |
|---|---|---|---|---|
| GB | 2312278 A * | 10/1997 | ............. | G01N 21/33 |
| JP | S61 35335 A | 2/1986 | | |
| JP | 2021056125 A * | 4/2021 | ............. | G01N 15/14 |

OTHER PUBLICATIONS

International Search Report and Written Opinion issued in connection with corresponding PCT Patent Application No. PCT/EP2020/080291 dated Feb. 15, 2021.

Office Action for CN application No. 202080079151.4, dated May 19, 2025, 18 pages.

\* cited by examiner

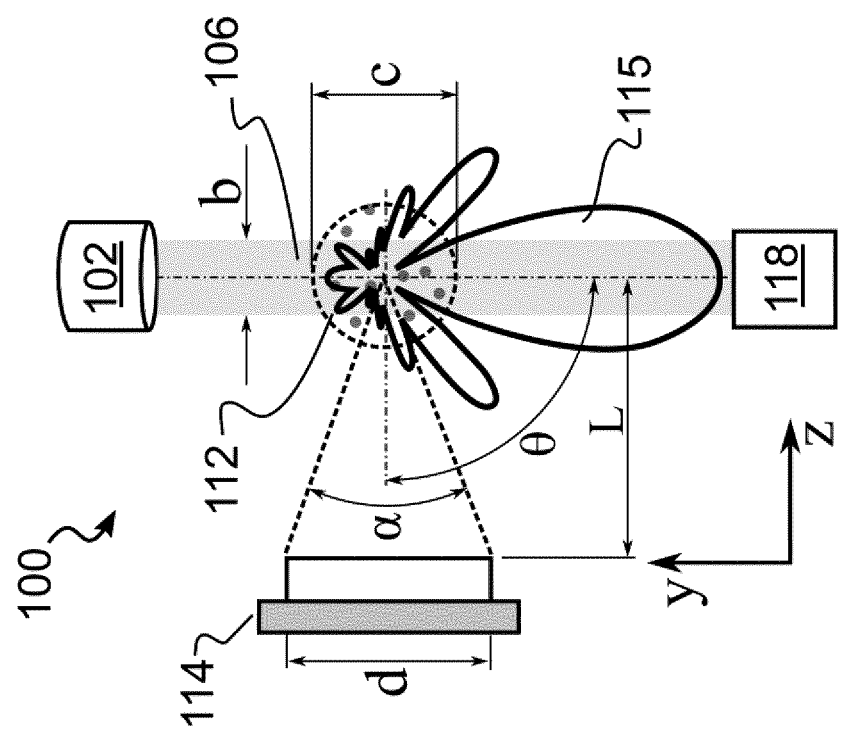
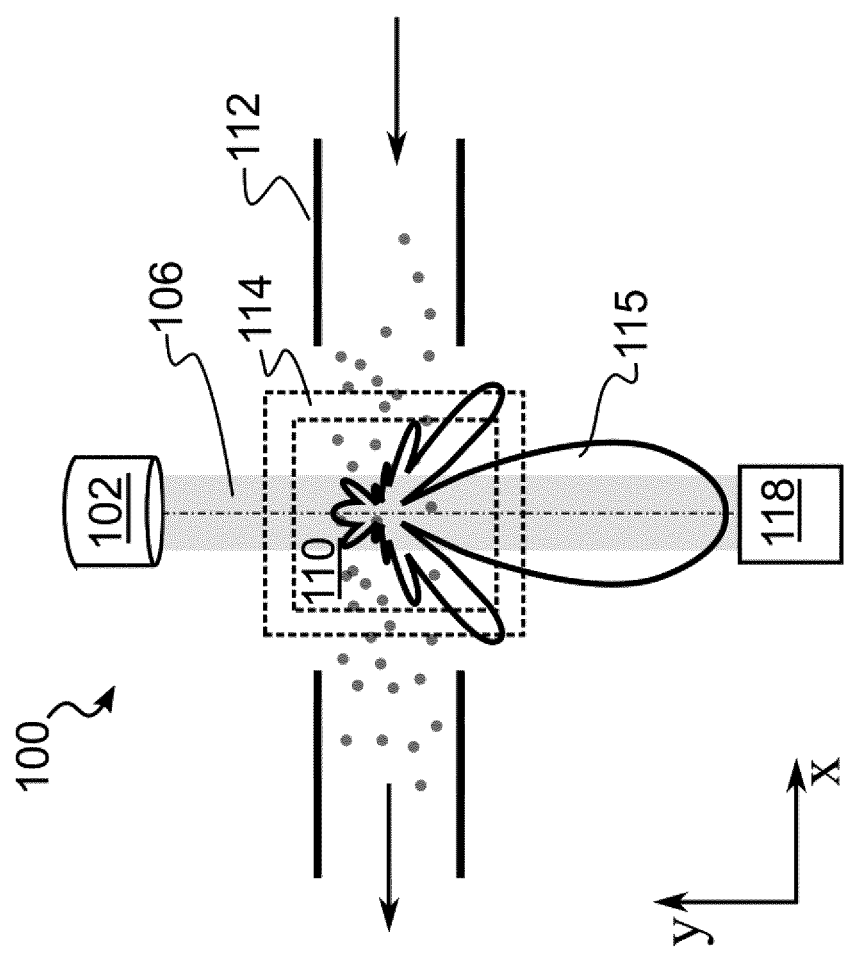

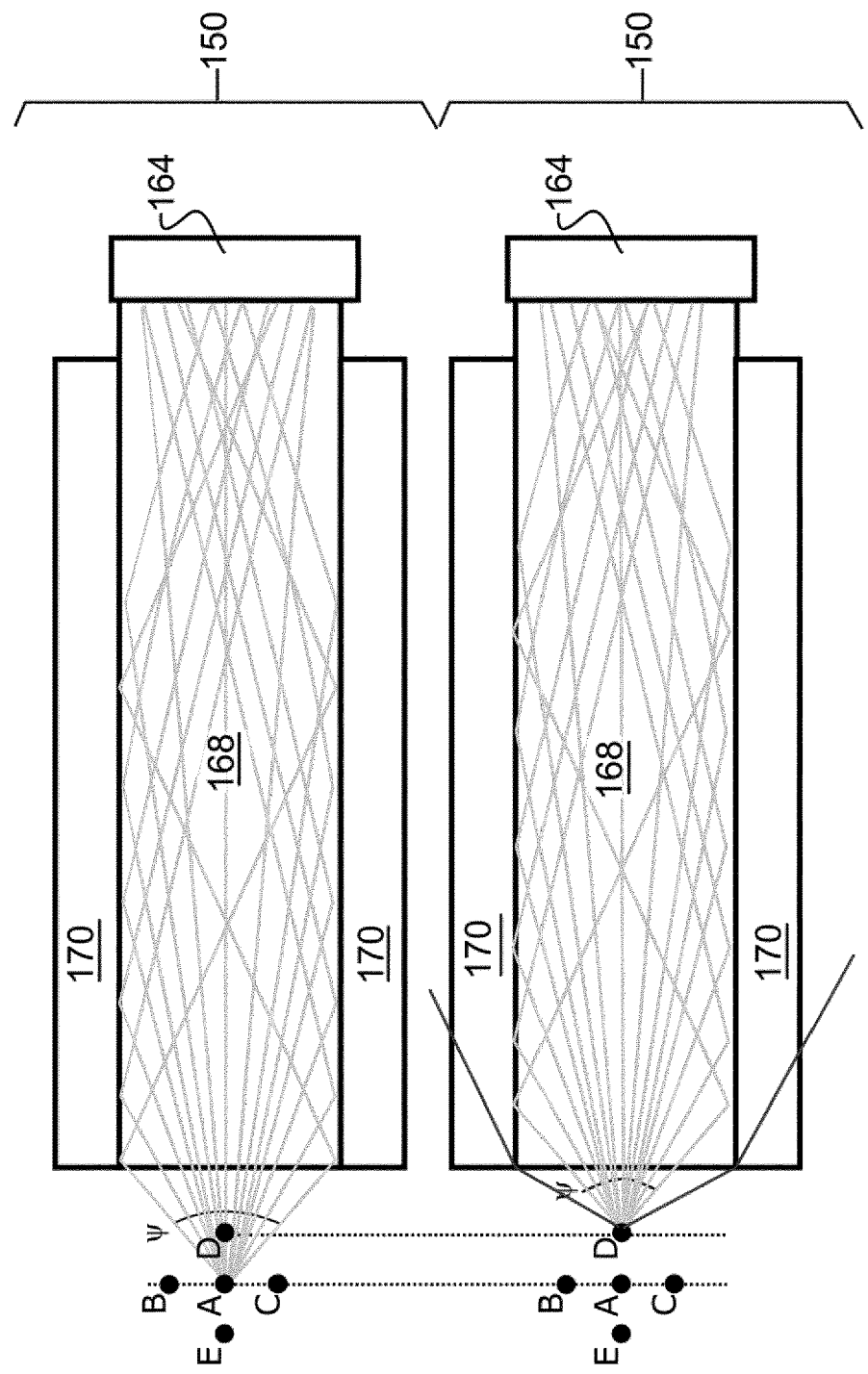

OPTICAL PARTICLE COUNTER FOR AIR QUALITY ASSESSMENT

RELATED APPLICATIONS

The present invention is a U.S. National Stage under 35 USC 371 patent application, claiming priority to Serial No. PCT/EP2020/080291, filed on Oct. 28, 2020, which claims priority from U.S. Provisional Patent Application No. 62/939,036, filed on Nov. 22, 2019; the entireties of both are hereby incorporated herein by reference.

BACKGROUND

There are various types of particulate matter sensors, including sensors based on optical scattering, sensors based light absorption of filters, diffusion charging based sensors, sensors based on gravimetric filter analysis, beta attenuation sensors, tapered element oscillating microbalance sensors, and photoacoustic sensors.

SUMMARY

We describe here approaches for optical based particulate matter sensing, e.g., for determining the concentration of particulate matter in a fluid or the size distribution of the particulate matter, such as micron sized particle matter. The systems described here utilize light scattering principles, such as systems including optical particle counters (OPC).

In an aspect, an apparatus for sensing particulate matter in a fluid includes a fluid flow conduit fluidically connected to an interaction chamber; a light source positioned to illuminate the interaction chamber; and a light detector assembly positioned to receive light scattered by particulate matter present in the interaction chamber. The light detector assembly includes a light detector; and an optical element, the optical element configured to provide light to the light detector based on an incidence angle of the scattered light.

Embodiments can include any combination of one or more of the following features.

The optical element is disposed directly on the light detector.

The optical element is configured to allow transmission of light to the light detector. The optical element includes an optical fiber, an end of the optical fiber being aligned with the light detector. The optical fiber includes a multimode optical fiber having a cladding. The optical element includes an interference filter. The optical element includes a bandpass or short-pass filter. The optical element includes a band pass filter is configured to allow transmission of light in a transmission band, in which for normal incidence, a wavelength of the scattered light is within about 10% of a lower bound of the transmission band. The band pass filter is configured to allow transmission of light in a transmission band, in which for angles of incidence higher than normal incidence, the transmission band is not centered around a wavelength of the scattered light.

The optical element is configured to allow reflection of light to the light detector.

One or more of the light detector and the optical element are segmented. The light detector is segmented into multiple sub-sensors, each sub-sensor measuring a corresponding angular portion of the scattered light.

In an aspect, a mobile communication device includes the apparatus of the previous aspect, including any combination of one or more of the foregoing features.

In an aspect, combinable with the previous aspect, a method for sensing particulate matter in a fluid, the method includes illuminating an interaction chamber with an illumination beam, a fluid containing particulate matter being present in the interaction chamber; and detecting, by a light detector assembly including a light detector, light scattered by the particulate matter present in the interaction chamber, including: filtering the scattered light by an optical element, the filtering allowing light to reach the light detector based on an incidence angle of the scattered light; and detecting the light by the light detector.

Embodiments can include any combination of one or more of the following features.

Filtering the scattered light includes allowing transmission of light to the light detector. Filtering the scattered light includes receiving the scattered light into an optical fiber, an end of the optical fiber being aligned with the light detector. Filtering the scattered light includes filtering the scattered light by an interference filter. Filtering the scattered light includes allowing transmission of light in transmission band, in which for incident angles higher than normal incidence, the transmission band is not centered around a wavelength of the scattered light. Allowing transmission of light includes allowing the light to propagate through an interference filter.

Filtering the scattered light includes reflecting light to the light detector.

The method includes determining a characteristic of particulate matter in the fluid based on the light scattered by the particulate matter. Determining a characteristic of the particulate matter includes determining a concentration of the particulate matter in the fluid. Determining a characteristic of the particulate matter includes determining a size distribution of the particulate matter.

In an aspect, combinable with one or more of the previous aspects, an apparatus for sensing particulate matter in a fluid includes a fluid flow conduit fluidically connected to an interaction chamber; an illumination assembly positioned to illuminate the interaction chamber with a shaped illumination beam having an intensity that increases across a diameter of the illumination beam from a first side of the illumination beam to a second side of the illumination beam opposite the first side; and a light detector disposed at the first side of the illumination beam and positioned to receive light scattered by particulate matter present in the interaction chamber.

Embodiments can include any combination of one or more of the following features.

The second side of the illumination beam corresponds to particulate matter furthest from the light detector.

The apparatus includes a light source configured to output an initial illumination beam; and an optical element positioned between the light source and the interaction chamber and configured to shape the initial illumination beam into the shaped illumination beam.

The apparatus includes multiple light sources arranged to form the shaped illumination beam.

In an aspect, a mobile communication device includes the apparatus of the previous aspect, including any combination of one or more of the foregoing features.

In an aspect, combinable with one or more of the previous aspects, a method for sensing particulate matter in a fluid, the method includes illuminating an interaction chamber with a shaped illumination beam having an intensity that increases across a diameter of the illumination beam from a first side of the illumination beam to a second side of the illumination beam opposite the first side, a fluid containing particulate matter being present in the interaction chamber; and detecting, by a light detector disposed at the first side of the illumination beam, light scattered by the particulate matter present in the interaction chamber.

Embodiments can include any combination of one or more of the following features.

Illuminating an interaction chamber with a shaped illumination beam includes outputting an initial illumination beam from a light source; and shaping the initial illumination beam by an optical element positioned between the light source and the interaction chamber.

Illuminating an interaction chamber with a shaped illumination beam includes operating multiple light sources, light emitted by each of the multiple light sources together forming the shaped illumination beam.

The method includes determining a characteristic of particulate matter in the fluid based on the light scattered by the particulate matter. Determining a characteristic of the particulate matter includes determining a concentration of the particulate matter in the fluid. Determining a characteristic of the particulate matter includes determining a size distribution of the particulate matter.

The approaches described here can have one or more of the following advantages. The optical based particulate matter sensors can operate with high sensitivity and high energy efficiency, and can detect and measure particulate matter accurately in a broad range of sizes and concentrations. The optical particulate matter sensors are robust to variation of the position of particulate matter in the sensor and can produce particle size measurements that are independent of the particulate matter position. The optical based particulate matter sensors are compact and able to be manufactured using mass production techniques, such as semiconductor processing techniques, rendering the sensors inexpensive. The sensors can be integrated into a wide ranges of types of devices, such as handheld devices, automotive devices, or industrial devices, and as such can be applicable to a wide range of uses.

BRIEF DESCRIPTION OF DRAWINGS

FIGS. 1A and 1B are diagrams of an optical-based particulate matter sensor.

FIGS. 9A and 9B are diagrams of a light detector assembly.

DETAILED DESCRIPTION

Figure 2:
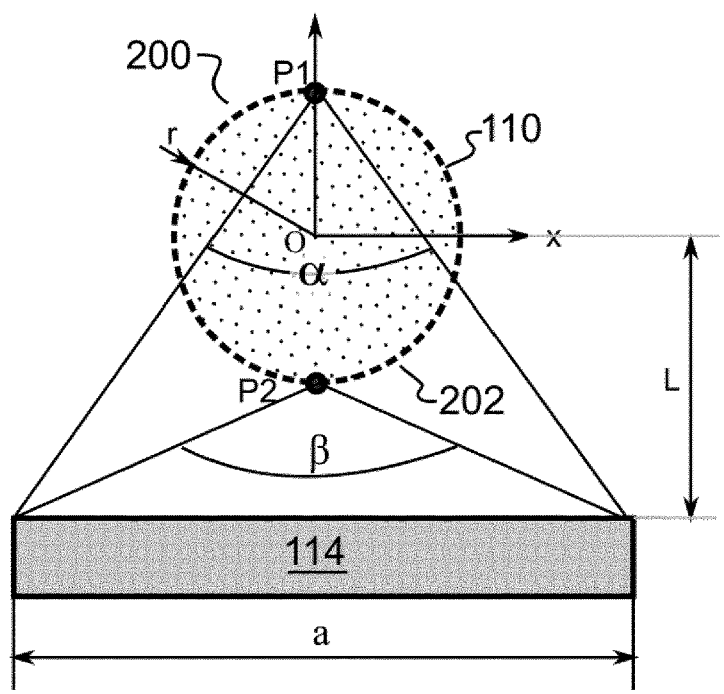
FIG. 2 is a diagram of light scattering.

We describe here approaches for optical based particulate matter sensing, e.g., for determining the concentration of particulate matter in a fluid or the size distribution of the particulate matter, such as micron sized particle matter. The systems described here utilize light scattering principles, such as systems including optical particle counters (OPC).

Optical based particulate matter sensors described here incorporate features that can reduce the dependence of the measured intensity of the scattered light on the position of the particles by which the light was scattered, thereby improving accuracy of the sensors. In some examples, the optical based particulate matter sensors described here can measure only certain angular portions of the scattered intensity distribution, e.g., contributing to suppression of stray light based on angle of incidence, wavelength, or both.

In some examples, the sensors can incorporate optical elements or can include specific arrangements of system components to shape the illumination beam to mitigate the effect of position dependent intensity of scattered light. In some examples, the sensors can implement angular filtering to selectively filter scattered light by the angle of incidence prior to detection. For instance, angular filtering can be implemented by leveraging the angle selectivity of interference filter or by total internal reflection.

FIGS. 1A and 1B show a top view and a side view, respectively, of an optical-based particulate matter sensor 100 that is configured to detect particulate matter in a fluid, such as an aerosol. The particulate matter sensor 100 detects the intensity of light scattered by single particles. A signal based on the detected intensity can be used to characterize the particulate matter in the fluid, e.g., to determine a concentration of the particulate matter in the fluid, a size distribution of the particulate matter in the fluid, or both. In some examples, the particulate matter sensor 100 can be part of a particulate matter sensor system, such as an integrated, microfluidic system, e.g., a system based on complementary metal oxide semiconductor (CMOS) technology.

The particulate matter sensor 100 includes a light source 102 (e.g., a vertical cavity surface emitting laser (VCSEL), a light emitting diode (LED), a laser diode, or another type of light source) operable to emit a light beam 106 into a particle-light interaction chamber 110 (also referred to as simply the interaction chamber 110). Fluid flows through a fluid flow conduit 112, which can be substantially perpendicular to the direction of the light beam 106 (as shown) or can be oriented in another direction relative to the light beam 106. In the example of FIGS. 1A and 1B, the path of the light beam 106 is in the y-direction and the fluid flow conduit 112 is in the x-direction. In some examples, the particulate matter sensor 100 can include one or more optical elements, such as reflective surfaces, light apertures, or other optical elements, to guide the light from the light source 102 into the interaction chamber 110.

As fluid flows through the conduit 112, the light beam 106 interacts, in the particle-light interaction chamber 110, with particulate matter in the fluid. The interaction causes scattering of the light, e.g., with an intensity distribution 115 that is distinct to one or more characteristics of the particles, such as one or more of the particle shape, the material composition of the particles, and the particle size. A portion of the scattered light is scattered toward a light detector 114 (e.g., a photodiode) operable to detect the scattered light. Light that does not interact with the particulate matter continues to travel into a light trap chamber 118 to prevent the light from being reflected back toward the detector 114.

The detector 114 can be implemented, for example, as an optical photosensor that is operable to measure the signal of a single particle. In such instances, the pulse height (e.g., the intensity of the light signal corresponding to the light scattered by an individual particle) is proportional to particle size, and the pulse count rate corresponds to the number of detected particles. The concentration of particulate matter in the fluid can be derived, for example, from the number of detected particles, if the amount of the analyzed volume is known (e.g., air flow rate, measurement time). The detector 114 can be integrated, for example, into a semiconductor chip that also may include electronics for reading, amplifying and processing the signals. In some cases, the processing circuitry can reside in a separate chip. In some examples, the light detector can be split or segmented into multiple sub-sensors, where each sub-sensor measures a different portion of the scattered intensity distribution, thereby contributing to a reduction in the ambiguity in particle sizing.

Referring also to FIG. 2, the position of a particle relative to the light detector 114 and the size and shape of the light detector define the angular portion of the scattered distribution received by the light detector 114, hereafter referred to as the "solid angle." For instance, for scattering by a particle P1 at a far side 200 of the interaction chamber 110 relative to the light detector 114, scattered light within a solid angle α is received by the light detector 114. However, for scattering by a particle P2 at a close side 202 of the interaction chamber 110 relative to the light detector 114, scattered light within a larger solid angle β is received by the light detector 114. For identically sized particles P1 and P2, this difference in solid angle leads to a difference in signal intensity detected by the light detector 114, which can in turn introduce the potential for error in particle sizing determination, e.g., leading to an under- or over-estimation of particle size.

Figure 3:
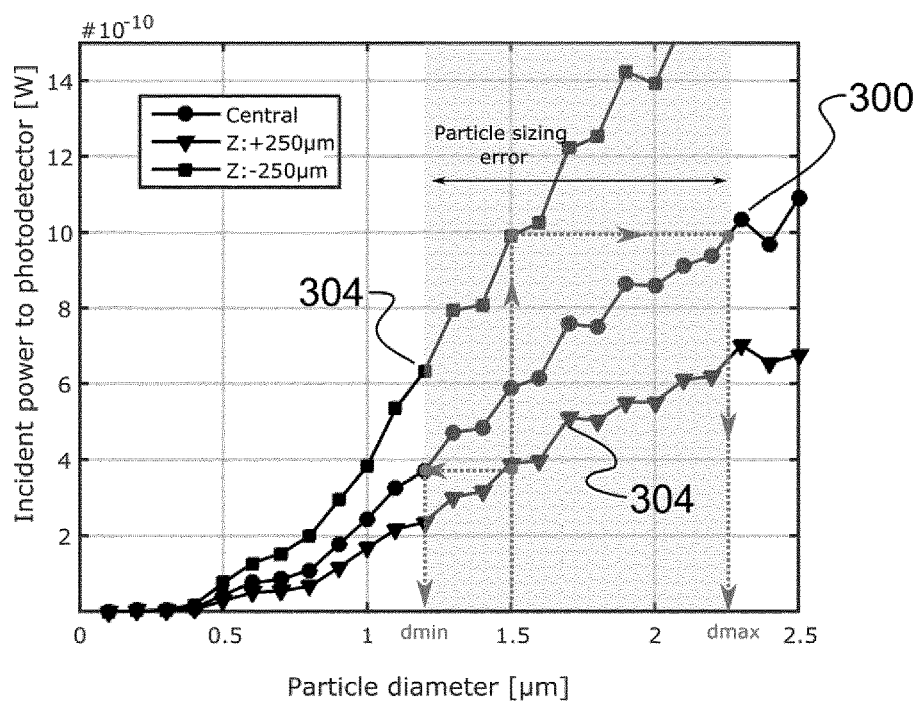
FIG. 3 is a plot of scattered light intensity versus particle size.

FIG. 3 is a plot of an example of scattered light intensity versus particle diameter for particles in three different positions in the interaction chamber: centered in the interaction chamber (curve 300), 250 μm farther from the detector (curve 302), and 250 μm closer to the detector. For a particle with diameter of 1.5 μm, varying the position of the particle results in significant intensity variations (as can be seen by the cross-section points along the vertical line at 1.5 μm). Projecting these intensities back to the reference curve for central position reveals the particle sizing error (here shown in gray), also referred to as particle sizing estimation uncertainty, with lower bound at dmin and upper bound at dmax. In this particular example, the particle sizing error is extended over large portion of the measurement range of interest, limiting the performance of such a sensor to particle counting only.

In some examples, the intensity distribution of the illumination beam can be shaped to at least partially compensate for this position-dependent signal intensity. For instance, the illumination beam can be shaped to have an intensity distribution that is asymmetric with respect to the illumination chamber, e.g., such that an intensity of the beam is greater at the far side 200 of the interaction chamber than at the closer side 202 of the interaction chamber (e.g., as opposed to having a substantially symmetric shape with respect to the interaction chamber, such as having a Gaussian distribution of intensity centered at a center of the interaction chamber). The asymmetric intensity distribution can offset, at least in part, the difference in intensity of the scattered light as a function of particle position, helping to mitigate potential particle sizing error.

Figure 4:
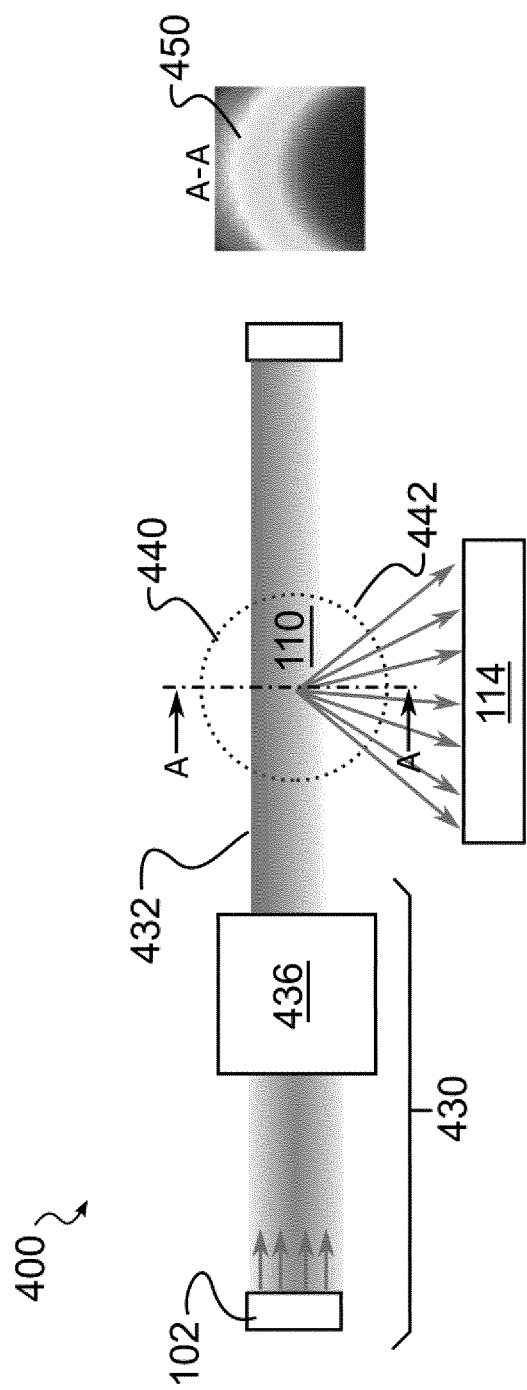
FIG. 4 is a diagram of an optical-based particulate matter sensor.

Referring to FIG. 4, an optical-based particulate matter sensor 400 includes an illumination assembly 430 that is configured to illuminate the interaction chamber 110 with a shaped illumination beam 432. By a shaped illumination beam, we mean an illumination beam that has an intensity distribution that is non-symmetric with respect to the interaction chamber. For instance, the shaped illumination beam 432 can have an intensity that increases across a diameter of the beam from a first side 442 closest to the light detector 114, to a second side 440 farthest from the light detector 114, as shown in a cross sectional intensity profile 450 of the shaped illumination beam 432. This shaping results in a weighting of the scattering signals from particles in the interaction chamber 110 that is inversely proportional to the solid angle of the particles, e.g., such that the scattering signal from a particle far from the light detector 114 is increased relative to the scattering signal from a particle closer to the light detector 114. The weighting of the scattering signals can in turn contribute to a reduction in signal variation and an enhanced accuracy in particle sizing. For instance, in some examples, the signal variation due to particle position in the particulate matter sensor 400 can be reduced to about 10% of the amplitude of the perceived signal, whereas uncompensated errors can reach, e.g., 80% of the signal amplitude and more.

In the example of FIG. 4, the illumination assembly 430 includes the light source 102, which emits a light beam 434, and an optical element 436 positioned between the light source 102 and the interaction chamber 110 and configured to shape the light beam 434 into the shaped illumination beam 432. For instance, the optical element 436 can include one or more refractive elements, such as lenses, or one or more diffractive elements, or a combination of refractive elements and diffractive elements. In some examples, the illumination assembly 430 can include multiple emitters arranged or configured to generate the shaped illumination beam 432 (discussed with respect to FIG. 6).

In some examples, the shaped illumination beam 432 can be formed by one-dimensional shaping of the light beam 434, which can be, e.g., a collimated beam. In some examples, the shaped illumination beam 432 can be formed by volumetric shaping of the light beam 434. For instance, volumetric shaping can be used to account for signal variations that arise from varying particle positions along the light path 106 or along the direction of fluid flow through the interaction chamber 110.

Figure 5C:
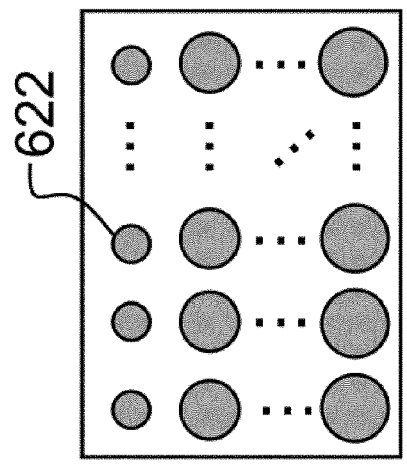
FIGS. 5A-5C are diagrams of light sources.
Figure 5B:
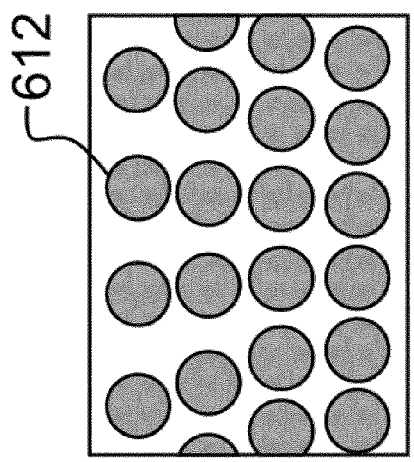

As noted above, in some examples, the illumination assembly can include multiple light sources arranged or configured to generate a shaped illumination beam 432. Examples of multiple light sources are shown in FIGS. 5A-5C.

Figure 5A:
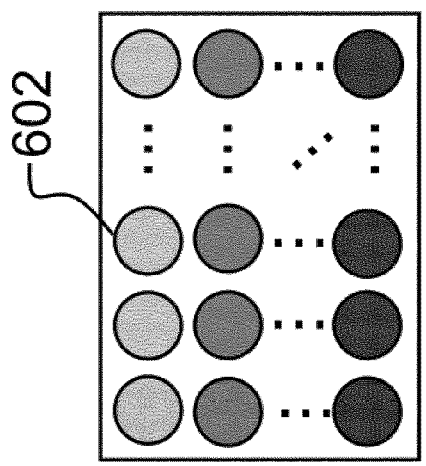

Referring to FIG. 5A, in some examples, the illumination assembly can include an array of multiple light sources 602, such as multiple VCSELs. The power of each light source 602 (depicted in the figure by shades of gray) can be controlled to achieve a target intensity distribution as the output from the multiple light sources 602. Referring to FIG. 5B, in some examples, the illumination assembly can include light sources 612 that are arranged in an irregular arrangement to achieve a target intensity distribution. For instance, the spacing between adjacent light sources 612 can vary across the illumination assembly. Referring to FIG. 5C, in some examples, the illumination assembly can include multiple light sources 612 of different sizes that are arranged to achieve a target intensity distribution. Other approaches can also be used, such as a combination of one or more of the approaches of FIGS. 5A-5C.

Figure 6:
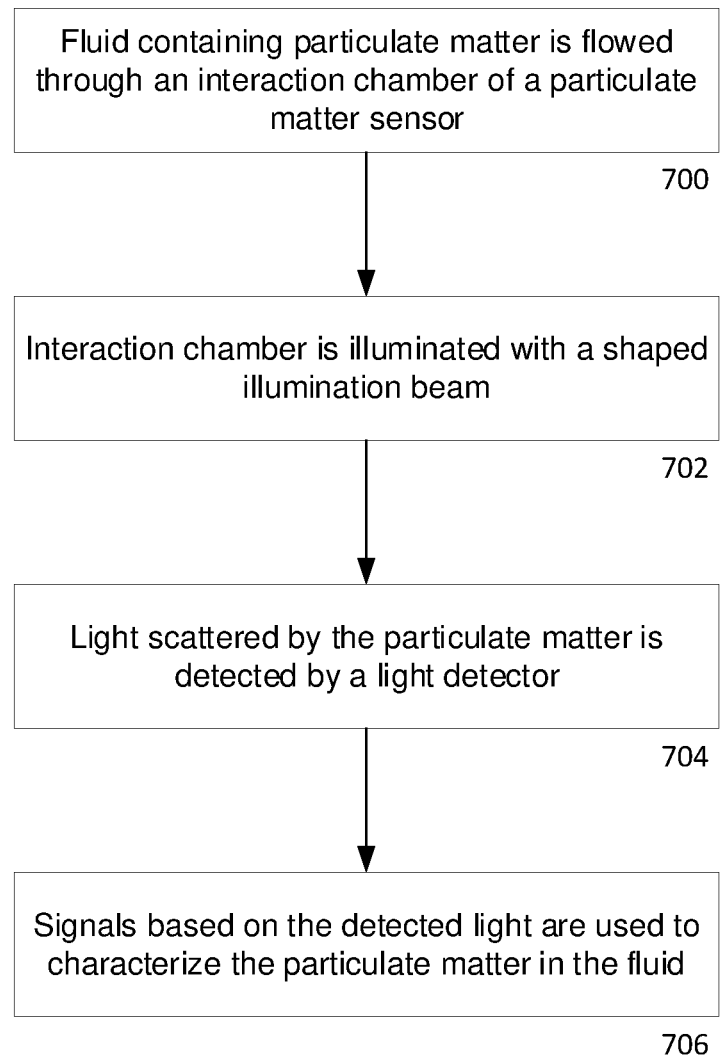
FIG. 6 is a flow chart.

Referring to FIG. 6, in an example of an approach to optical-based particulate matter sensing, fluid containing particulate matter is flowed through an interaction chamber of a particulate matter sensor (700).

The interaction chamber is illuminated with a shaped illumination beam (702), such as an illumination beam that has an intensity distribution that is non-symmetric with respect to the interaction chamber. For instance, the shaped illumination beam can have an intensity that increases across a diameter of the illumination beam from a first side of the illumination beam to a second side of the illumination beam opposite the first side. In some examples, the shaped illumination beam can be generated by shaping a light beam from a light source using one or more optical elements positioned between the light source and the interaction chamber. In some examples, the shaped illumination beam can be generated by operating multiple light sources that are arranged or configured to generate the shaped illumination beam.

Light scattered by the particulate matter present in the interaction chamber is detected by a light detector (704). The shaped illumination beam can at least partially offset variations in the scattered signal that can result from differences in solid angle among particles located at different positions around the interaction chamber, thereby contributing to enhanced accuracy.

Signals based on the light detected by the light detector are used to characterize the particulate matter in the fluid (706), such as determining a concentration or size distribution of the particulate matter in the fluid.

In some examples, an optical-based particulate matter sensor can implement angular filtering to at least partially compensate for the dependence of the intensity of the scattered light signal on the position of the particles in the interaction chamber. For instance, the optical-based particulate matter sensor can include an optical element, such as an interference filter or an optical fiber, that allows only scattered light that satisfies a threshold solid angle (e.g., light within the threshold solid angle) to reach the light detector. This angular filtering can at least partially harmonize the solid angle at which light scattered by particles at various positions in the interaction chamber is received by the light detector, helping to mitigate potential particle sizing error.

Figure 7:
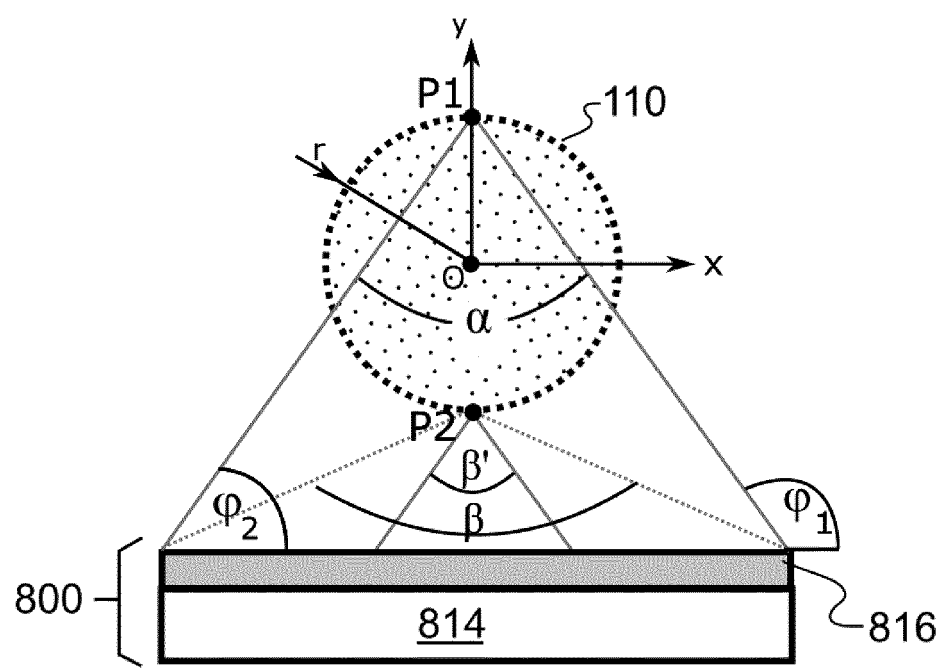
FIG. 7 is a diagram of a light detector assembly.

Referring to FIG. 7, an optical-based particulate matter sensor that implements angular filtering can include a light detector assembly 800 that is positioned to receive light scattered by particulate matter in the interaction chamber 110 of the particulate matter sensor. The light detector assembly 800 includes a light detector 814 (e.g., a photodiode) and an optical element including a thin film interference filter 816. For instance, the interference filter 816 can be disposed on a surface of the light detector 814, e.g., by thin-film fabrication techniques.

In some examples, the interference filter 816 can be a short-pass or band pass filter that only transmits light in a desired angular range, e.g., light that satisfies a threshold solid angle. Light having an angle of incidence outside of the threshold solid angle is not transmitted by the interference filter 816 and thus does not reach the light detector 814.

As discussed above with respect to FIG. 2, in the absence of angular filtering, the solid angle within which light is received by the light detector is larger for particles close to the light detector than for particles farther from the light detector. For instance, light scattered by a particle P1 far from the light detector is received by the light detector within a solid angle $\alpha$, while light scattered by a particle P2 close to the light detector is received within a larger solid angle $\beta$. For identically sized particles P1 and P2, this difference in solid angle leads to a difference in signal intensity detected by the light detector.

The angular filtering implemented by the interference filter 816 can at least partially harmonize the solid angle within which light is received by the light detector 814 across all positions in the interaction chamber to reduce differences in signal intensity arising from position-based differences in the solid angle of the light received by the light detector 814. The interference filter 816 can prevent light beyond a threshold angle of incidence from reaching the light detector. In the example of FIG. 7, the interference filter 816 can be designed such that the threshold angle $\beta'$ is less than $\beta$, and typically equal or less than $\alpha$. Reducing the threshold angles to values substantially lower than the angle of the farthest possible particle ($\alpha$) can lead to reduction of the signal, hence affecting the detection ability of the sensor. In the example of FIG. 7 the threshold angle is set to $\alpha$, meaning that the solid angle within which light scattered by a particle is received by the light detector 814 is the same regardless of the position of the particle in the interaction chamber 110. As a result, for a particle of the same size in this example, the amount of scattered light that reaches the light detector 814 will be substantially the same regardless of the position of the particle in the interaction chamber 110, in turn yielding substantially the same signal intensity regardless of the particle position in the interaction chamber 110. This at least partial harmonization of the solid angle across positions in the interaction chamber 110 can help mitigate potential particle sizing error.

Figure 8A:
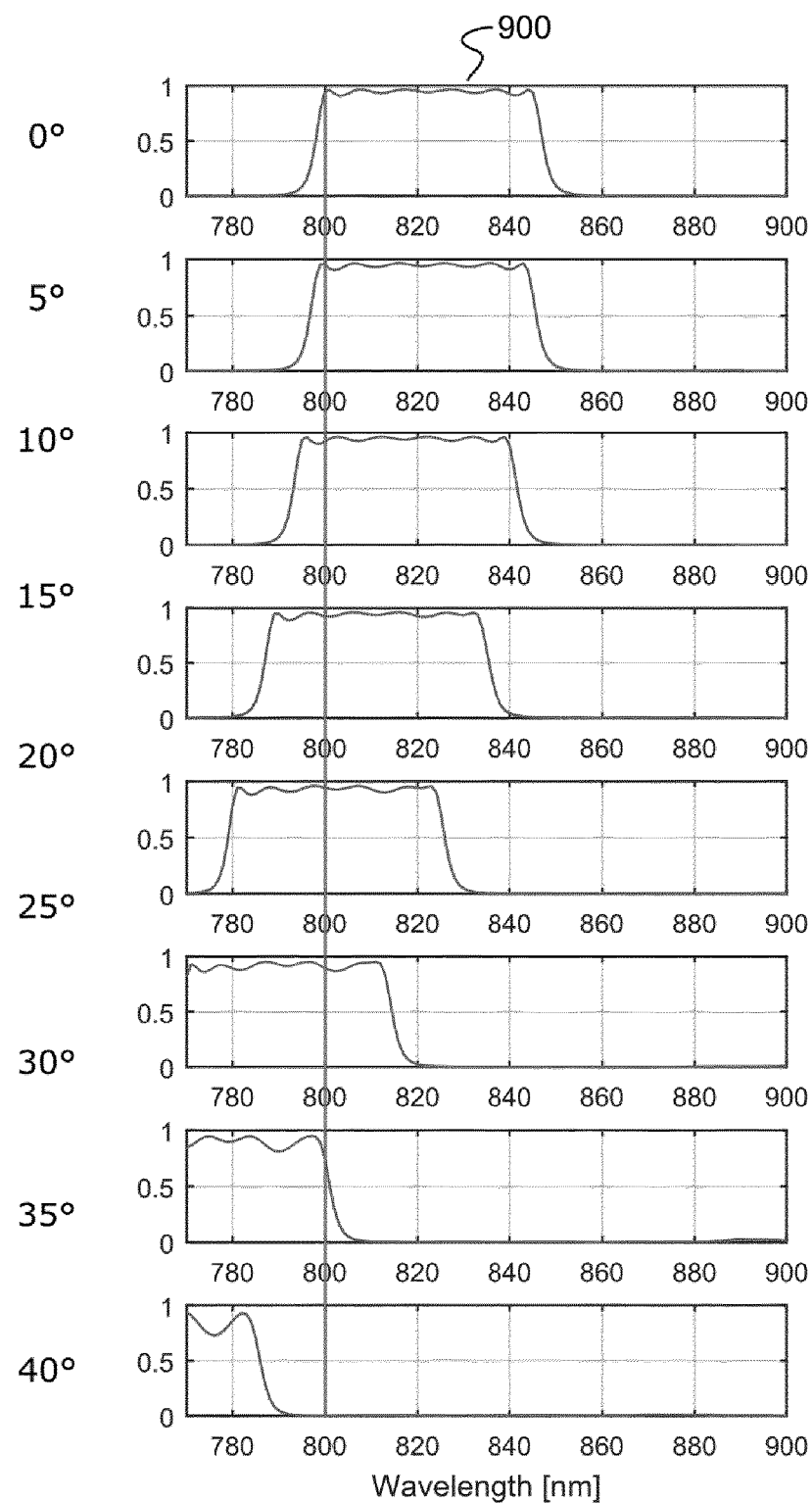
FIGS. 8A and 8B are plots of light transmission.
Figure 8B:
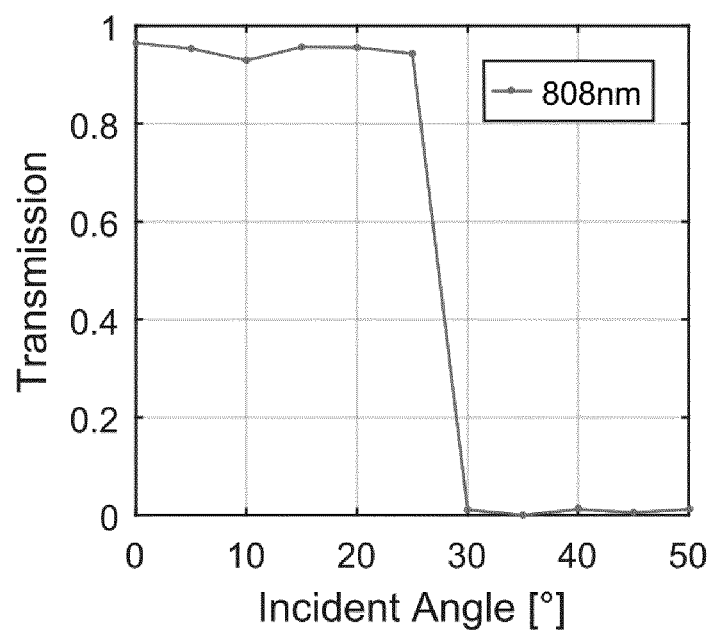

Referring to FIGS. 8A and 8B, in some examples, the interference filter can be implemented as a short-pass or band pass filter. Such filter has one or more transmission bands, which are wavelength ranges in which light is substantially transmitted through the filter and blocked (reflected or absorbed) otherwise. The transmission bands of an interference filter are defined by the angular range and the wavelength. In general, the transmission bands of interference filters depend on the angle of incidence of light on the filter and typically shift towards shorter wavelengths with increasing angle of incidence.

In some examples, when the desired angular transmission range covers normal incidence, the transmission band (in case of a band pass filter) can be designed such that the lower edge of the transmission band is placed at the chosen wavelength. The upper edge of the transmission band is defined by the highest incidence angle of the required angular transmission range. For monochromatic applications short-pass filter with cut-off centered at a desired threshold incident angle at target wavelength can be used.

In some examples, if the desired angular transmission range covers the angular range with lower bound higher than 0° relative to normal incidence, the filter can be designed as a band pass filter, with lower transmission bound centered at wavelength, higher than the target wavelength. The lower transmission bound is defined to transmit light of desired wavelength at the minimum allowed angle of incidence of the angular portion, and the higher transmission bound to transmit maximum allowed angle of incidence for target wavelength. This way, such a filter transmits only desired angular portion of light at chosen wavelength. This can have applications for the reduction of stray light.

Referring again to FIG. 7, in some examples, the presence of the interference filter 816 can introduce the additional benefit of reducing the amount of stray light that reaches the light detector 814, thereby contributing to an improved signal-to-noise ratio.

In some examples, the light detector 814, the interference filter 816, or both can be segmented to allow for the capture of additional information about the distribution of the scattered light, e.g., which can be used for more accurate estimation of particle size or other properties of the particulate matter, such as optical properties (e.g., refractive index of the particles).

Angular filtering of transmitted light also can be implemented in reflection mode. Here, the scattered light is bounced from the thin film filter before reaching the detector. In such configuration, the band-pass filter can be replaced by a notch filter, where upper and lower bounds of the reflected band are defined by the angular portion to be received by the photodetector.

Angular filtering generally targets monochromatic applications and single angular region. It is however possible to expand the underlying principles for polychromatic or multi-angular bands operation or any combination of the both. As such the filter features one or several transmission/reflection bands, where each of the transmission bands can be optimized for filtering of several different wavelengths and several different angular bands. Despite substantially more complex definition of the transmission/reflection bands in those cases, the underlying concept of the angular filtering remains the same as described.

Referring to FIGS. 9A and 9B, an optical-based particulate matter sensor (e.g., the sensor 100 of FIG. 1) that implements angular filtering can include a light detector assembly 150 that is positioned to receive light scattered by particulate matter in the interaction chamber of the particulate matter sensor. The light detector assembly 150 includes a light detector 164 (e.g., a photodiode) and an optical element including an optical fiber 166, such as a multimode optical fiber, with an end of the optical fiber 166 being positioned such that light propagating through the optical fiber 166 is incident on the light detector 164.

Angular filtering of incident light by the optical fiber 166 can be implemented by leveraging the effect of total internal reflection, e.g. as occurs in the in multimode optical fibers or similar light-guiding optics. Specifically, the optical fiber or light-guiding structure 166 includes a core 168 and a cladding 170. The refractive index of the core 168 and the cladding 170 can affect the acceptance angle of the optical fiber 166, which is the threshold angle below which light is accepted by the optical fiber 166 (and thus can reach the light detector 164) and above which light cannot propagate in the optical fiber 166 (and thus does not reach the light detector 164). The light that cannot propagate in the optical fiber gets coupled in the waveguide and is scattered and refracted out of the light-guiding fiber.

The angular filtering implemented by the multimode optical fiber 166 or light guiding structure can at least partially harmonize the solid angle within which light is received by the light detector 164 across all positions in the interaction chamber to reduce differences in signal intensity arising from position-based differences in the solid angle of the light received by the light detector 164. The optical fiber 166 can prevent light beyond a threshold angle of incidence from reaching the light detector. The threshold angle can be, e.g., the angle below which total internal reflection occurs in the optical fiber 166.

By designing the optical fiber 166 such that the threshold angle is less than the solid angle within which light scattered by particles close to the optical fiber 166 is received by the light detector 164, the position dependence of signal intensity can be reduced. For instance, the optical fiber 166 can have a threshold angle that is between the solid angle within which light scattered by particles close to the optical fiber 166 is received by the light detector 164 and the solid angle within which light scattered by particles far from the optical fiber 166 is received.

FIG. 9A shows the acceptance, by the optical fiber 166, of light scattered by a particle at point A, far from the optical fiber 166. FIG. 9B shows the acceptance, by the optical fiber 166, of light scattered by a particle at point D, closer to the optical fiber 166. The threshold angle of the optical fiber 166 harmonizes the solid angle within which scattered light is received by the optical fiber 166, reducing the position dependence of the solid angle and thus of the intensity of scattered light received by the light detector 164 for a given particle size. For instance, in the example of FIGS. 9A and 9B, the threshold angle is selected to match the solid angle of a particle that is farthest away (particle at point E). This way, the solid angle of the light scattered by a particle received by the light detector 164 is the same regardless of the position of the particle in the interaction chamber. As a result, for a particle of the same size, the amount of scattered light that reaches the light detector 164 will be substantially the same regardless of the position of the particle in the interaction chamber, which in turn means that the intensity signal for a particle of a given size will be substantially the same regardless of the position of the particle in the interaction chamber. This at least partial harmonization of the solid angle across positions in the interaction chamber can help mitigate potential particle sizing error.

Referring also to FIGS. 10A-10E, the effect of particle position on receipt of light by the light detector is shown with and without angular filtering provided by multimode optical fiber or other light guiding optics 166. Each of FIGS. 10A-10E corresponds to the angular transmission of light for the corresponding point in FIGS. 9A-9B. An unfiltered curve 180a-180e corresponds to the angular dependence of light reaching the light detector without angular filtering by the optical fiber 166. Here, the light detector features the same size as the entrance of the fiber and is placed at the same position as the end face of the fiber. As can be seen from the unfiltered curves 180a-180e, particles located closer to the light detector 164 have broader range of angular transmission (e.g., the solid angle for light scattered by these particles is larger) than for particles located farther from the light detector 164. For instance, for a particle at point D (FIG. 10D), close to the light detector 164, scattered light reaches the light detector in a solid angle of ±45°. In contrast, for a particle at point E, far from the light detector, scattered light reaches the light detector in a much smaller solid angle of ±32°. This discrepancy in solid angle results in the position dependence intensity discussed above, that can lead to errors in particle size estimation.

Figure 10A:
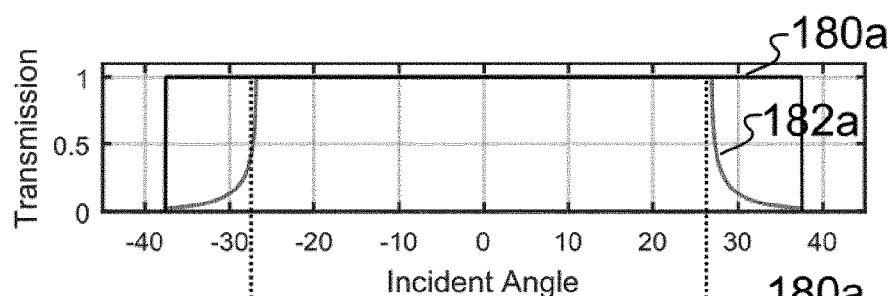
FIGS. 10A-10E are plots of light transmission.
Figure 10B:
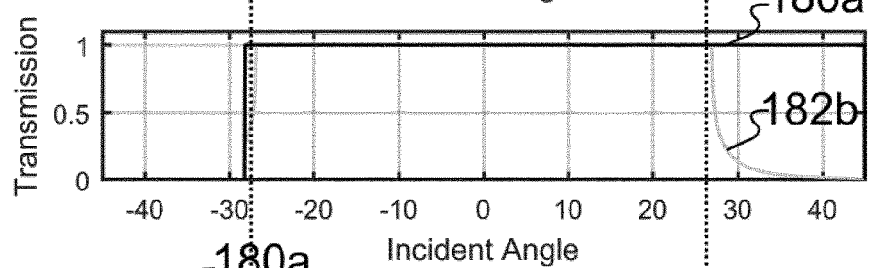
Figure 10C:
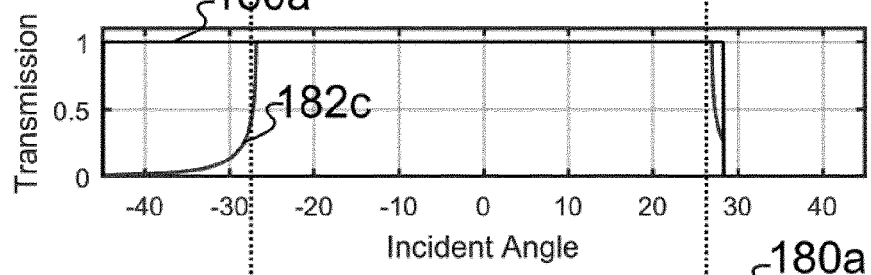
Figure 10D:
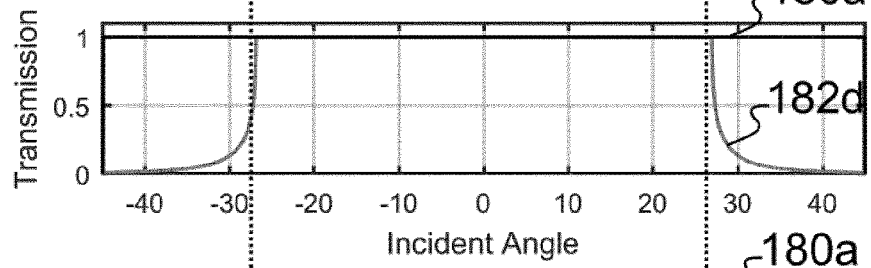
Figure 10E:
Figure 10F:
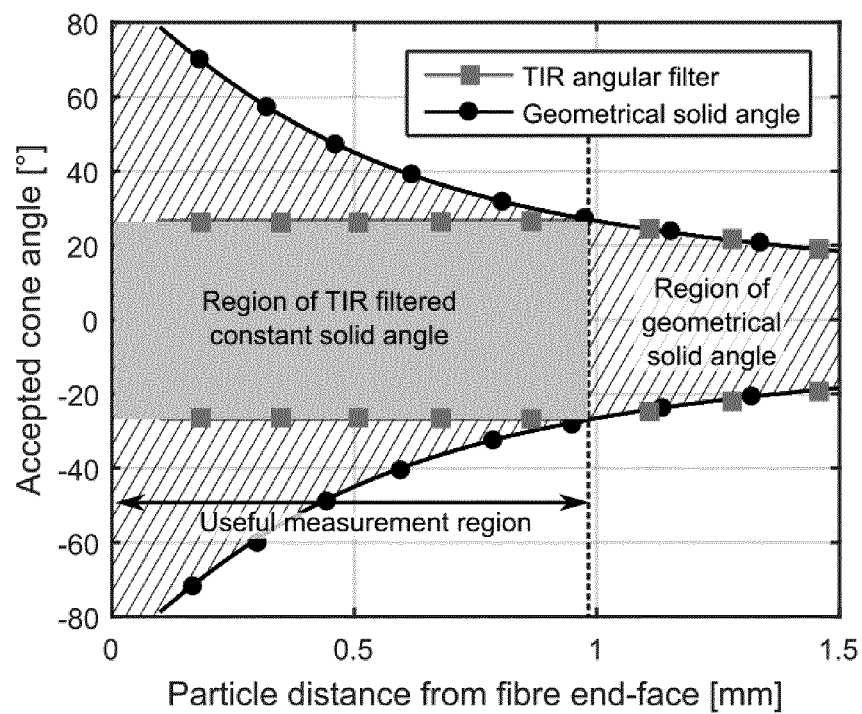
FIG. 10F is a plot of solid angles.
Figure 11:
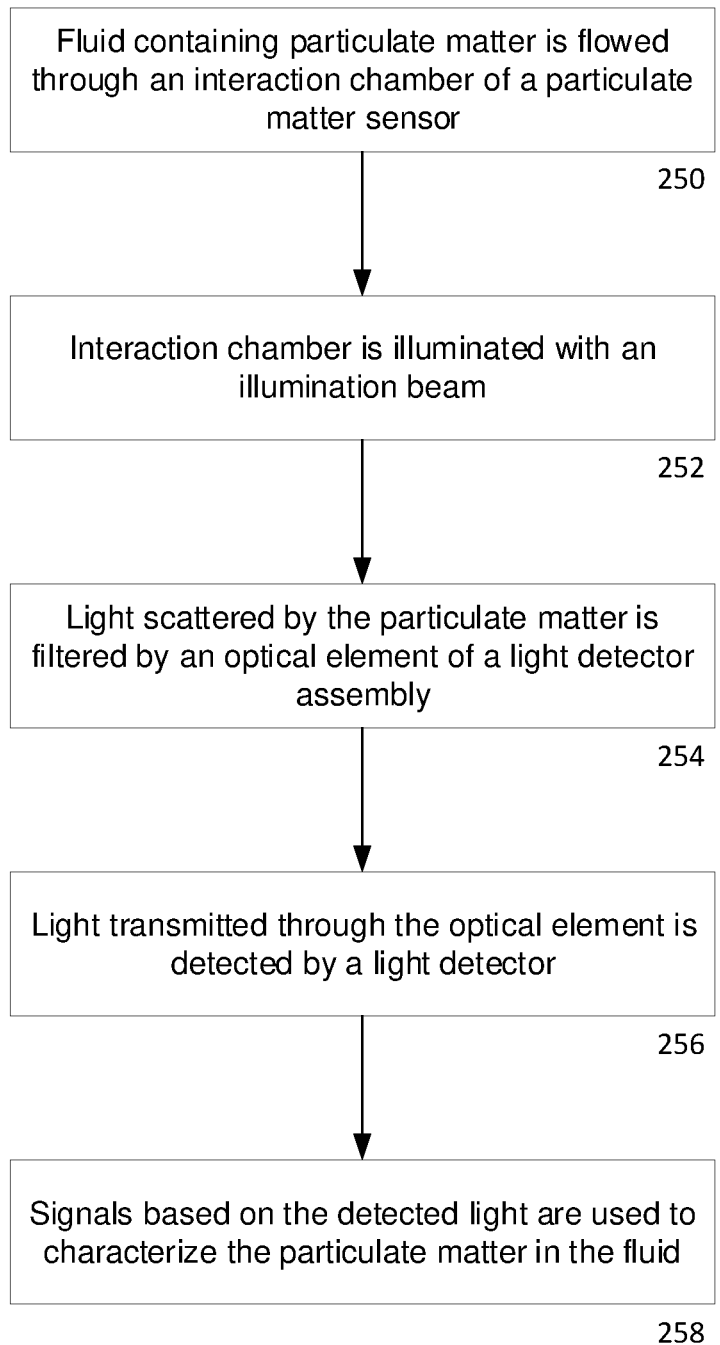
FIG. 11 is a flow chart.

FIG. 10F shows the difference in an solid angle between two different examples. In one example, an optical fiber was used to collect light and in the other, a photodiode of the same size as core diameter was used to collect light. The dashed region represents the solid angle w.r.t to particle distance, as collected with the photodiode. The shaded region corresponds to the solid angle w.r.t to particle distance, as collected with the optical fiber, with applied principles of angular filtering, as described above. In an example here, a fiber with core diameter of 1000 µm and refractive index of 1.5 and 1.43 for core and cladding material was used. In this particular example, the particle is positioned centrally to the optical axis of the fiber/detector, while the distance was varied from 0 to 1.5 mm away from the optical fiber/photodiode. As can be seen from FIG. 11F, the angular filtering using total internal reflection provides a constant solid angle disrespectful of particle position from the end-face of the fiber, up to the critical distance, where geometrical solid angle is smaller than the acceptance angle of the optical fiber. The useful measurement region is therefore limited to this critical distance in order to assure constant solid angle.

With the inclusion of the optical fiber 166 that implements angular filtering, the position dependence of the angular transmission is decreased, as shown in filtered curves 182a-

182e. For instance, by utilizing an optical fiber 166 that has a threshold acceptance angle equal to the smallest solid angle in the position dependence (here, ±27°, the position dependence of the signal intensity can be substantially eliminated.

Figure 12:
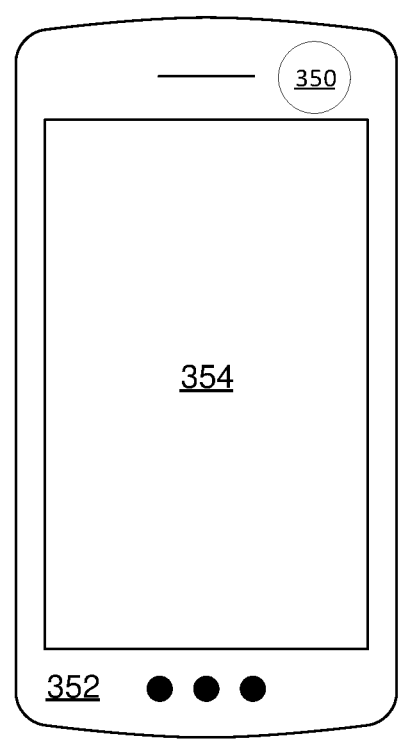
FIG. 12 is a diagram of a mobile computing device.

Referring to FIG. 12, in an example of an approach to optical-based particulate matter sensing, fluid containing particulate matter is flowed through an interaction chamber of a particulate matter sensor (250). The interaction chamber is illuminated with an illumination beam (252).

Light scattered by the particulate matter present in the interaction chamber is filtered by an optical element of a light detector assembly (254). In some examples, the optical element is an optical fiber that filters the optical element by total internal reflection based on the incidence angle of the light. In some examples, the optical element is an interference filter, such as a thin film interference filter, that allows transmission of light in a range of incidence angles. The angular filtering of the scattered light can at least partially harmonize the solid angle at which light scattered by particles at various positions in the interaction chamber is received by the light detector, helping to mitigate potential particle sizing error.

The light that is transmitted through the optical element is detected by a light detector (256). Signals based on the light detected by the light detector are used to characterize the particulate matter in the fluid (258), such as determining a concentration or size distribution of the particulate matter in the fluid.

Referring to FIG. 13, a particulate matter sensor system 350 such as those described above can be incorporated into a mobile computing device 352, such as a mobile phone (as shown), a tablet, or a wearable computing device. The particulate matter sensor system 350 can be operable by a user, e.g., under control of an application executing on the mobile computing device 352, to conduct air quality testing. A test result can be displayed on a display screen 354 of the mobile computing device 352, e.g., to provide substantially immediate feedback to the user about the quality of the air in the user's environment.

The particulate matter sensor systems described here can also be incorporated into other devices, such as air purifiers or air conditioning units; or used for other applications such as automotive applications or industrial applications.

A number of embodiments have been described. Nevertheless, it will be understood that various modifications may be made without departing from the spirit and scope of the invention. For example, some of the steps described above may be order independent, and thus can be performed in an order different from that described.

Other implementations are also within the scope of the following claims.

The invention claimed is:

1. An apparatus for sensing particulate matter in a fluid, the apparatus comprising:
   a fluid flow conduit fluidically connected to an interaction chamber;
   an illumination assembly positioned to illuminate the interaction chamber with a shaped illumination beam having an intensity that increases across a diameter of the illumination beam from a first side of the illumination beam to a second side of the illumination beam opposite the first side; and
   a light detector disposed at the first side of the illumination beam and positioned to receive light scattered by particulate matter present in the interaction chamber.

2. The apparatus of claim 1, in which the second side of the illumination beam corresponds to particulate matter furthest from the light detector.

3. The apparatus of claim 1, comprising:
   a light source configured to output an initial illumination beam; and
   an optical element positioned between the light source and the interaction chamber and configured to shape the initial illumination beam into the shaped illumination beam.

4. The apparatus of claim 1, comprising multiple light sources arranged to form the shaped illumination beam.

5. A mobile communications device comprising the apparatus of claim 1.

6. A method for sensing particulate matter in a fluid, the method comprising:
   fluidically connecting a fluid flow conduit to an interaction chamber;
   positioning an illumination assembly to illuminate the interaction chamber with a shaped illumination beam having an intensity that increases across a diameter of the illumination beam from a first side of the illumination beam to a second side of the illumination beam opposite the first side; and
   disposing a light detector at the first side of the illumination beam and positioned to receive light scattered by particulate matter present in the interaction chamber.

* * * * *